(12) United States Patent
Espejel et al.

(10) Patent No.: US 8,583,695 B2
(45) Date of Patent: Nov. 12, 2013

(54) METHOD AND APPARATUS FOR EVALUATING STATISTICAL SIGNIFICANCE OVER TIME

(75) Inventors: Daniel Espejel, Charlotte, NC (US); Kathleen Dierdre Sill, Irmo, SC (US)

(73) Assignee: Bank of America Corporation, Charlotte, NC (US)

( * ) Notice: Subject to any disclaimer, the term of this patent is extended or adjusted under 35 U.S.C. 154(b) by 970 days.

(21) Appl. No.: 11/427,071

(22) Filed: Jun. 28, 2006

(65) Prior Publication Data

US 2008/0001393 A1 Jan. 3, 2008

(51) Int. Cl.
G06F 7/00 (2006.01)
G06F 17/30 (2006.01)
G06F 12/00 (2006.01)

(52) U.S. Cl.
USPC .......................................... 707/798; 707/803

(58) Field of Classification Search
USPC ........................................................ 707/102
See application file for complete search history.

(56) References Cited

U.S. PATENT DOCUMENTS

| | | | |
|---|---|---|---|
| 6,202,068 B1 * | 3/2001 | Kraay et al. | 1/1 |
| 6,606,615 B1 * | 8/2003 | Jennings et al. | 706/45 |
| 6,859,674 B1 * | 2/2005 | Seth et al. | 700/97 |
| 2002/0059003 A1 * | 5/2002 | Ruth et al. | 700/19 |
| 2002/0169652 A1 * | 11/2002 | Busche | 705/10 |
| 2002/0184132 A1 * | 12/2002 | Foster | 705/36 |
| 2003/0061212 A1 * | 3/2003 | Smith et al. | 707/6 |
| 2003/0167278 A1 * | 9/2003 | Baudel | 707/102 |
| 2003/0182333 A1 * | 9/2003 | Good et al. | 708/131 |
| 2004/0015481 A1 * | 1/2004 | Zinda | 707/1 |
| 2005/0102316 A1 * | 5/2005 | Lawson et al. | 707/102 |
| 2005/0154769 A1 * | 7/2005 | Eckart et al. | 707/201 |
| 2005/0288892 A1 * | 12/2005 | Martini | 702/179 |
| 2006/0111977 A1 * | 5/2006 | Hawkins | 705/14 |

OTHER PUBLICATIONS

Archie Lockamy; The Development of a supply chain management process maturity model using the concepts of business process orientation; Supple Chain Management;2004; pp. 272-278.*

* cited by examiner

*Primary Examiner* — Shew-Fen Lin
*Assistant Examiner* — Jermaine Mincey
(74) *Attorney, Agent, or Firm* — Michael A Springs; Moore & Van Allen PLLC; Padowithz Alce

(57) ABSTRACT

Method and apparatus for evaluating statistical significance over time are described. A graphical display helps to establish if an improvement produces effective results over a period of time relative to similar results from a control group. This graphical display can be achieved in part by calculating and plotting the control group's "area of common performance" representing confidence intervals around the mean of the metric being analyzed. Subject group data can be represented by either a run chart or a box plot, depending on whether the subject group data is discrete or continuous. In some embodiments a hypothesis test can be performed on the data to verify the representation.

18 Claims, 6 Drawing Sheets

METHOD AND APPARATUS FOR EVALUATING STATISTICAL SIGNIFICANCE OVER TIME

BACKGROUND

Understanding how changes to a business process within a company or enterprise affect the goals of the business, such as those of maximizing revenue, profit, or market share, is of enormous importance and has a significant impact on the company's success in the marketplace. Ideally therefore, changes to business processes should be monitored and/or tested in much the same ways as changes to manufacturing processes are monitored and/or tested. In particular, it is important to know how various changes within the business enterprise drive changes in various metrics, so that management can understand which changes are successful and which are not.

Despite the above described need, it is often difficult to show how a change in a part of a business process influences a metric. Part of the problem is that at least some available statistical tools rely on the premise that a numerical goal remains stable. For some types of processes, for example, transactional processes, this premise is not the case. A retail or service business, for example, is typically always expected to grow its market share through increasing sales, revenue, and profits.

SUMMARY

Embodiments of the present invention can provide a graphical display that helps to establish if an improvement to a process that is a subject of study produces effective results over a period of time relative to similar results from a control group. This graphical display can be achieved in part by calculating and plotting the control group's "area of common performance" representing confidence intervals around the mean of the metric being analyzed. A run chart or box plot can then be plotted against the area of common performance to highlight changes.

In example embodiments of the invention, a statistical significance over time (SSOT) chart can be created by plotting an area of common performance of a control group using control group data, plotting the subject group data, and then merging the area of common performance and the subject group data to ultimately display the SSOT chart. In example embodiments, the area of common performance can be obtained by calculating a mean for the control group data, calculating a confidence interval for the control group data, and then determining the area of common performance from that mean and confidence interval information.

Subject group data can be represented by either a run chart or a box plot, depending on whether the subject group data is discrete or continuous. In some embodiments a hypothesis test can be performed on the data to verify the representation. Examples of tests that can be performed include a one sample t-test for continuous subject group data, and a two sample t-test for discrete subject group data.

Some embodiments of the invention may take the form of, or be enabled by a computer program product including a computer usable medium encoded with computer usable program code. Such computer program code coupled with an operating system and an appropriate instruction execution system can form the means to carry out embodiments of the invention.

DETAILED DESCRIPTION OF THE INVENTION

Figure 1A:
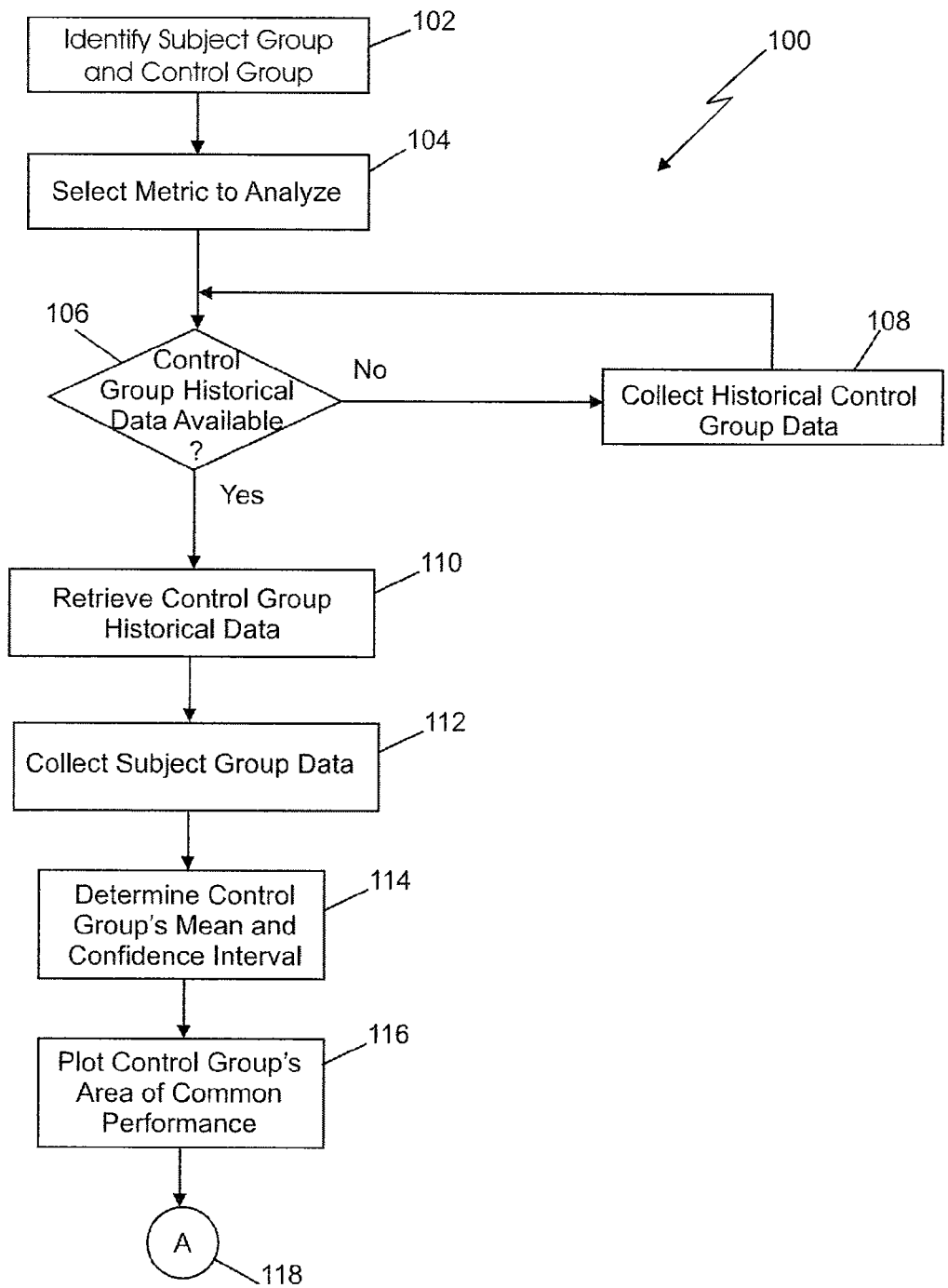
FIGS. 1A and 1B are interconnected flowcharts that illustrate the method according to at least some embodiments of the present invention.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

With respect to some of the terminology contained herein, terms such as "plotting" and "displaying" as well as "calculating," "merging" and similar terms are meant in their broadest sense. Such terms can denote process steps that are carried out within the memory of a computing system, or can denote actual, graphical manipulations that can be viewed by a user. In the context of an embodiment of the invention, these terms may indicate activities that are carried out in whole or in part by either a machine or a user. Other terms that are used herein have their ordinary and customary meaning in the art, or are defined in the context of their use.

Figure 1B:
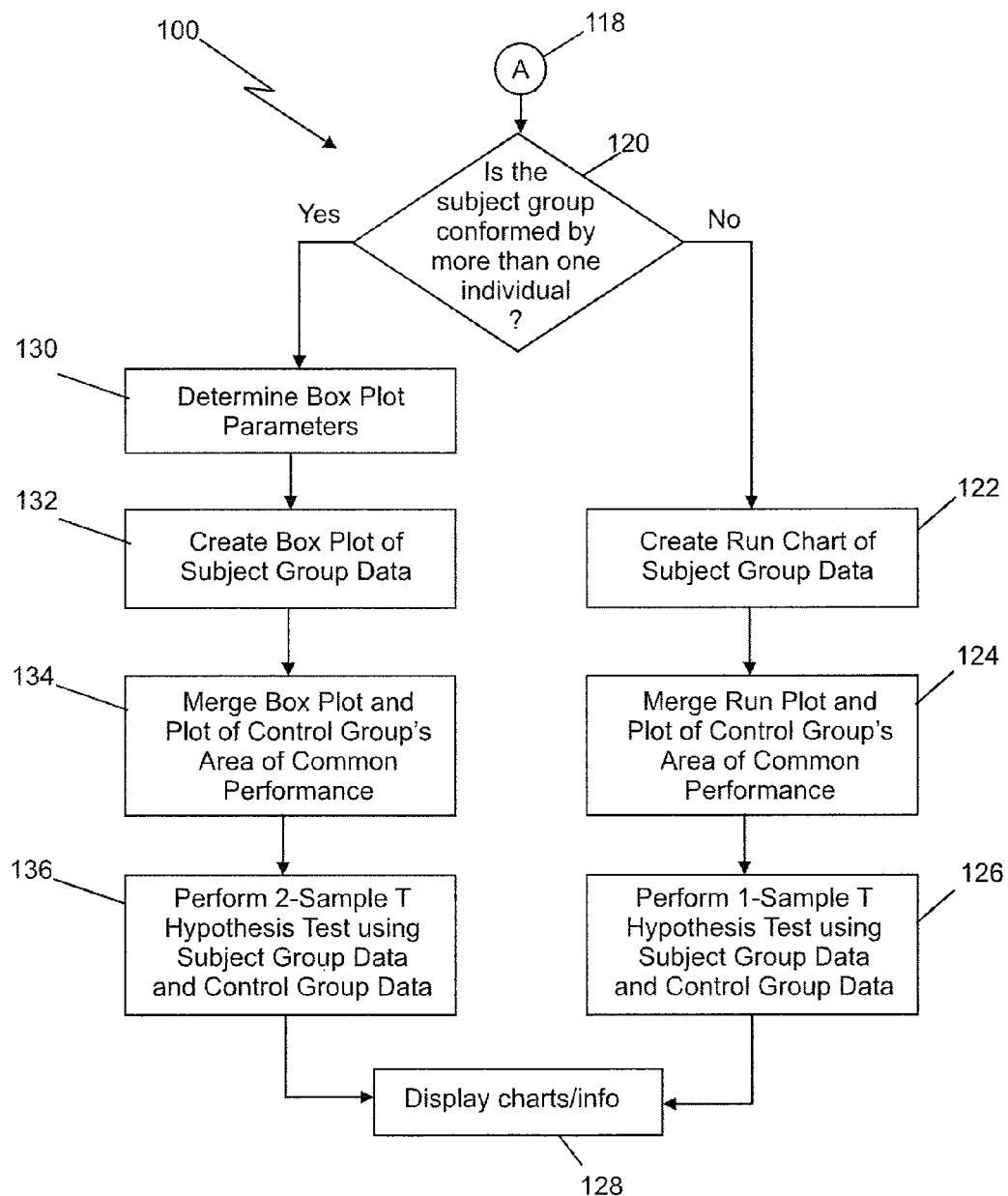

FIG. 1 shows a flowchart which describes the overall method of example embodiments of the present invention. FIG. 1 is divided into FIGS. 1A and 1B for clarity. As is true with most flowcharts, the process shown in FIG. 1 is illustrated as a series of process blocks. Process 100 of FIG. 1 begins at block 102 where subject and control group information and/or data is identified. This portion of the process can be carried out by a human operator, or can be carried out by a computer system receiving input or accessing a database.

In a similar fashion, at block 104, the appropriate metric for analysis is identified, selected, or input. A determination must be made at block 106 as to whether the appropriate historical data for the control group is available. If it is not available, it can be collected at block 108, with the help of automated data collection tools, as is known in the art. Otherwise, the appropriate historical data is retrieved at 110, for example from a database stored locally or on a network. Subject group data is similarly collected at block 112. The subject group data may be collected from a database, input by a user, received over a network, or acquired in any other way known in the art.

Still referring to FIG. 1, in particular FIG. 1A, the control group's mean and confidence interval are determined through calculations at block 114. Examples of specific formulas that can be used for these calculations are given in this disclosure, with respect to a specific illustrative example discussed later. At block 116, the area of common performance for the control group is plotted so that an appropriate chart can be eventually displayed, to enable a user to determine the statistical significance over time of the change that is being evaluated. At block 118, processing branches to point "A" of FIG. 1B, where the appropriate process takes place to calculate, plot, and display subject group data.

Turning to FIG. 1B, process 100 continues from block 118 to block 120, where processing branches depending on whether the subject group is conformed by more than one individual. If the subject is a single individual, a "run chart", also sometimes called a "run plot" is created at block 122. A run chart displays process performance over time. Upward and downward trends, cycles, and large aberrations may be spotted and investigated further. In a run chart, events, shown on the Y axis, are graphed against a time period on the X axis. Such a chart tends to highlight changes at specific points in time. With embodiments of the present invention, a run chart can be used to track improvements that have been put into place, checking to determine their success.

Still referring to FIG. 1B, at block 124, the run plot and the area of common performance are merged. The merger of these two indications displays the statistical significance over time of a change to the control group. This is in contrast to a normal run chart, which displays the data versus an average, or some other fixed indication. In this example embodiment, prior to finalizing or even displaying the statistical significance over time (SSOT) chart, a one-sample-T hypothesis test can be performed at block 126. The mathematical formulas for doing such a test on the data are discussed in conjunction with the description of the detailed example of an embodiment of the invention being applied to a greeting card company, as presented later in this disclosure. In the example embodiments, the appropriate charts and information can be displayed to a user at block 128, once the hypothesis test has been passed.

Returning to decision block 120 of FIG. 1B, if the subject group is conformed by more than one individual, box plot parameters are determined at block 130. A box plot of the subject data is created at block 132. The box plot and the area of common performance are merged at block 134 in a similar fashion to the way a run plot and an area of common performance are merged as previously discussed. At block 136, a hypothesis test is again performed on the data to verify it. In this case, however, a two-sample-T hypothesis test is performed. Again, appropriate formulas that can be used in an example embodiment of the invention are discussed with respect to the greeting card company example presented later in this disclosure. In any case, the appropriate charts and information are displayed to a user at block 128 in the same manner as previously discussed.

It should be noted that the box plot as described herein is also sometimes called a "box and whisker" plot. Such a plot typically represents information from a number summary. It does not show a distribution in as much detail as, for example, a stem and leaf plot or a histogram does, but the box plot is especially useful for indicating whether a distribution is skewed and whether there are potential unusual observations, or changes over time in the data set. A box plot can also be thought of as a way of summarizing a set of data measured on an interval scale.

Figure 2:
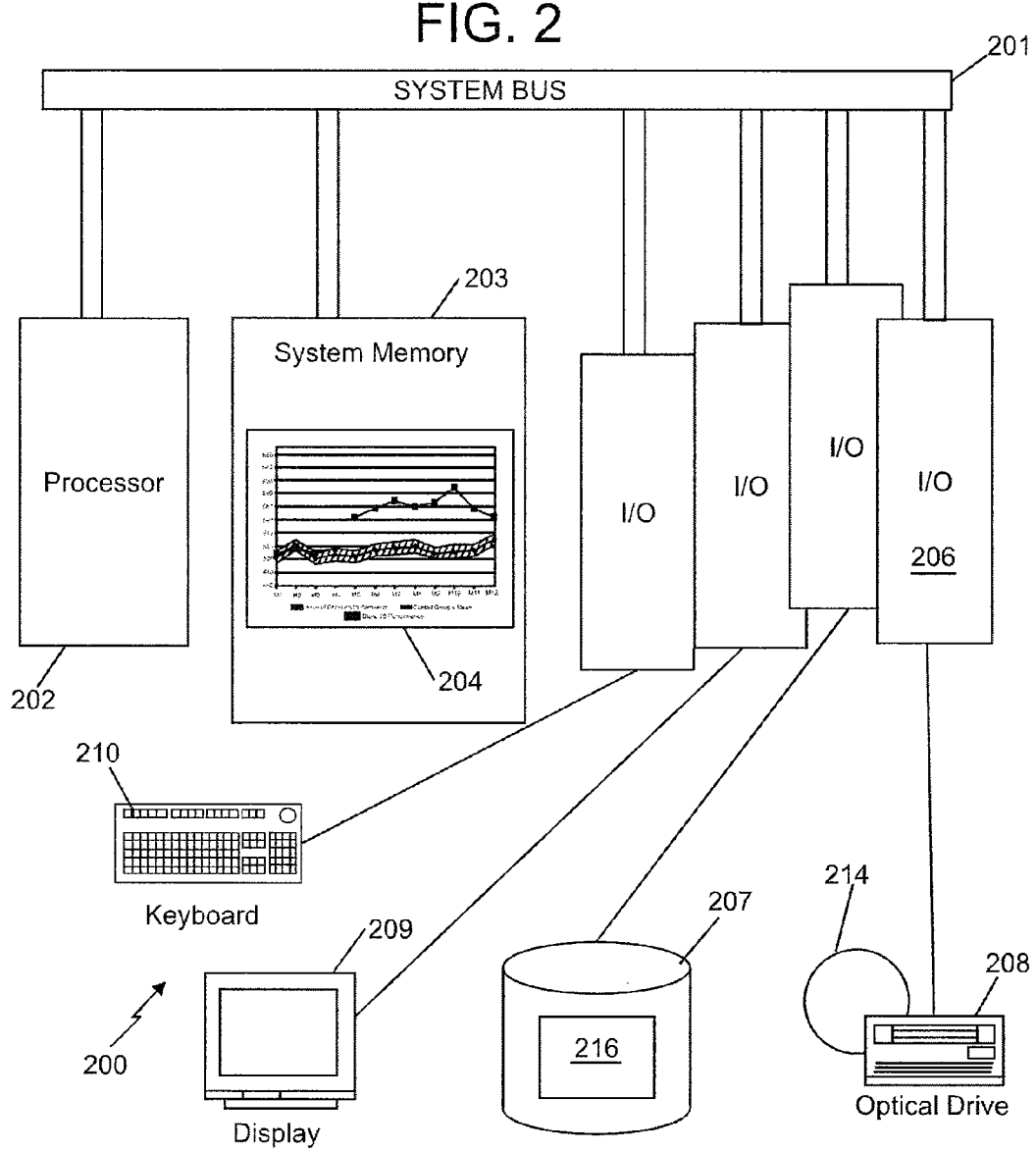
FIG. 2 is a system block diagram illustrating an instruction execution system that is performing the method of an example embodiment of the present invention.

As previously discussed, in some embodiments, the invention can be implemented through a computer program product operating on a programmable computer system or instruction execution system, such as a personal computer, server, workstation, or the like. FIG. 2 illustrates further detail of an instruction execution system, 200, that is implementing an embodiment of the invention. The system bus 201 interconnects the components. Processor 202 controls the system. In some embodiments, processor 202 is an Intel compatible microprocessor. System memory 203 can in some embodiments be divided into various regions or types of memory. Since an embodiment of the invention is operating in the system of FIG. 2, system memory 203 includes stored plot data 204.

Still referring to FIG. 2, a plurality of general input/output (I/O) adaptors or devices, 206, are present. These adaptors connect to various peripheral devices including fixed disk drive 207, optical drive 208, and display 209. A keyboard, 210, is also shown. Computer usable program code to implement an embodiment of the invention can be encoded on optical disk 214 and transferred as needed to fixed disk drive 207. Computer program code 216 then is loaded from the fixed disk drive into processor 202 and memory 203 as needed to cause instruction execution system 200 to carry out the method of the invention.

Having described the overall method of embodiments of the invention, a specific, concrete example of its application to a business problem will now be presented. It cannot be overemphasized that this example is illustrative only. The invention can be applied to many types of problems, and the technique can be customized to specific business problems in almost infinite ways. For purposes of illustration a fictional company and fictional personnel are used.

The sales regional manager for a greeting cards company in California manages twenty-two stores that sell the same line of products across her region. Historically, greeting card sales in California grow at a rate of 5% annually, but this growth is not linear, as sales are influenced by holidays and seasonal events; for instance, sales normally increase during certain months more than others; like February and December, when people seem to buy cards to send them to their family and friends through the mail. After working together with the marketing, technology and productivity teams of the greeting cards company, the sales regional manager has come up with a new sales process intended to accelerate sales, and she intends to roll it out across her region.

The sales regional manager would like to determine the impact of the new sales process by implementing the process in six of her stores and measuring the impact of sales during the current year, so she has put together a schedule where one of the store managers will be trained every two months, and she will be using total sales as the measure of overall performance. A statistical significance over time (SSOT) chart according to an example embodiment of the invention will be used to determine overall impact of the new process over a twelve-month time period.

In this case, the best way to determine the impact of the new process is to consider sales of unimproved stores as the data for the control group, while the data for the subject group would be comprised of sales obtained by stores whose manager has been trained in the new sales process. The sales regional manager asked her finance analyst to audit sales data of her region, and the data seems to be accurate. The table below captures total sales (in units) for twelve months after the initial rollout of the sales program.

| Store | Type of Data | M1 | M2 | M3 | M4 | M5 | M6 | M7 | M8 | M9 | M10 | M11 | M12 |
|---|---|---|---|---|---|---|---|---|---|---|---|---|---|
| Store 1  | Control | 503 | 525 | 501 | 503 | 509 | 516 | 520 | 526 | 515 | 504 | 506 | 507 |
| Store 2  | Control | 461 | 490 | 458 | 460 | 468 | 475 | 476 | 474 | 472 | 463 | 473 | 505 |
| Store 3  | Control | 474 | 502 | 472 | 483 | 471 | 485 | 484 | 500 | 483 | 479 | 491 | 503 |
| Store 4  | Control | 516 | 541 | 510 | 517 | 520 | 533 | 541 | 526 | 527 | 516 | 527 | 555 |
| Store 5  | Control | 476 | 515 | 472 | 480 | 476 | 482 | 497 | 504 | 484 | 481 | 492 | 517 |
| Store 6  | Control | 527 | 549 | 526 | 524 | 523 | 542 | 541 | 558 | 524 | 535 | 532 | 542 |
| Store 7  | Control | 504 | 540 | 502 | 514 | 506 | 527 | 512 | 526 | 511 | 524 | 504 | 551 |
| Store 8  | Control | 496 | 520 | 492 | 502 | 493 | 509 | 497 | 511 | 489 | 502 | 511 | 532 |
| Store 9  | Control | 506 | 510 | 502 | 507 | 505 | 513 | 524 | 503 | 515 | 525 | 521 | 519 |
| Store 10 | Control | 509 | 515 | 509 | 516 | 513 | 520 | 535 | 514 | 515 | 529 | 529 | 523 |
| Store 11 | Control | 518 | 539 | 520 | 522 | 519 | 517 | 530 | 523 | 519 | 520 | 528 | 543 |
| Store 12 | Control | 515 | 512 | 516 | 526 | 516 | 513 | 531 | 543 | 515 | 534 | 510 | 554 |
| Store 13 | Control | 518 | 541 | 524 | 524 | 521 | 526 | 520 | 538 | 532 | 538 | 541 | 519 |
| Store 14 | Control | 497 | 525 | 503 | 504 | 505 | 502 | 508 | 498 | 508 | 508 | 505 | 527 |
| Store 15 | Control | 520 | 516 | 514 | 528 | 520 | 541 | 532 | 547 | 526 | 515 | 538 | 549 |
| Store 16 | Control | 502 | 509 | 504 | 507 | 500 | 519 | 521 | 524 | 509 | 505 | 506 | 525 |

In order to determine the area of common performance for her SSOT charts, the sales regional manager calculates the mean and confidence interval of the control group data by time-period, using the following formulas.

Mean ($\bar{x}$)

$$\bar{x} = \frac{\sum_{i=1}^{N} x_i}{n} = \frac{x_1 + x_2 + x_3 + \ldots + x_N}{n}$$

x=every member of the population
n=Size of the population

Confidence Interval (CI$\bar{x}$)

$$CI\bar{x} = \bar{x} \pm t_{\alpha/2, n-1} \frac{s}{\sqrt{n}}$$

Figure 3:
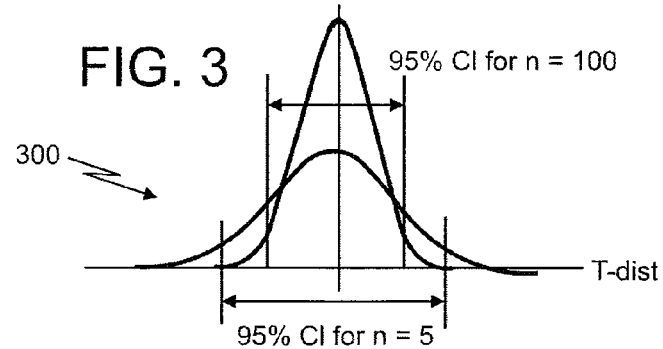
FIG. 3 illustrates the t-distribution used in an example application of an embodiment of the invention.

$\bar{x}$=Sample mean
$t_{\alpha/2,n-1}$=Confidence Factor=Constant based on a t-distribution
  s=Sample Standard Deviation
  n=Sample Size The t-distribution is a family of bell shaped (Normal-like) distributions that are dependent on sample size; the smaller the sample size, the wider and flatter the distribution For a 95% confidence factor, which is what the sales regional manager considers adequate, its corresponding t-value would be based on the following t-distribution table containing t-values vs. sample size at a 0.95 probability. A graphical illustration of the t-distribution, 300, is shown in FIG. 3.

| Sample Size | t-value (95% CI) |
|---|---|
| 5 | 2.78 |
| 10 | 2.26 |
| 16 | 2.13 |
| 20 | 2.09 |
| 30 | 2.05 |
| 100 | 1.98 |
| 1000 | 1.96 |

The following formula gives the standard deviation for the sample data.

$$s = \sqrt{\frac{\sum_{i=1}^{n}(x_i - \bar{x})^2}{(n-1)}}$$

The resulting calculations are shown in the following table.

Figure 4:
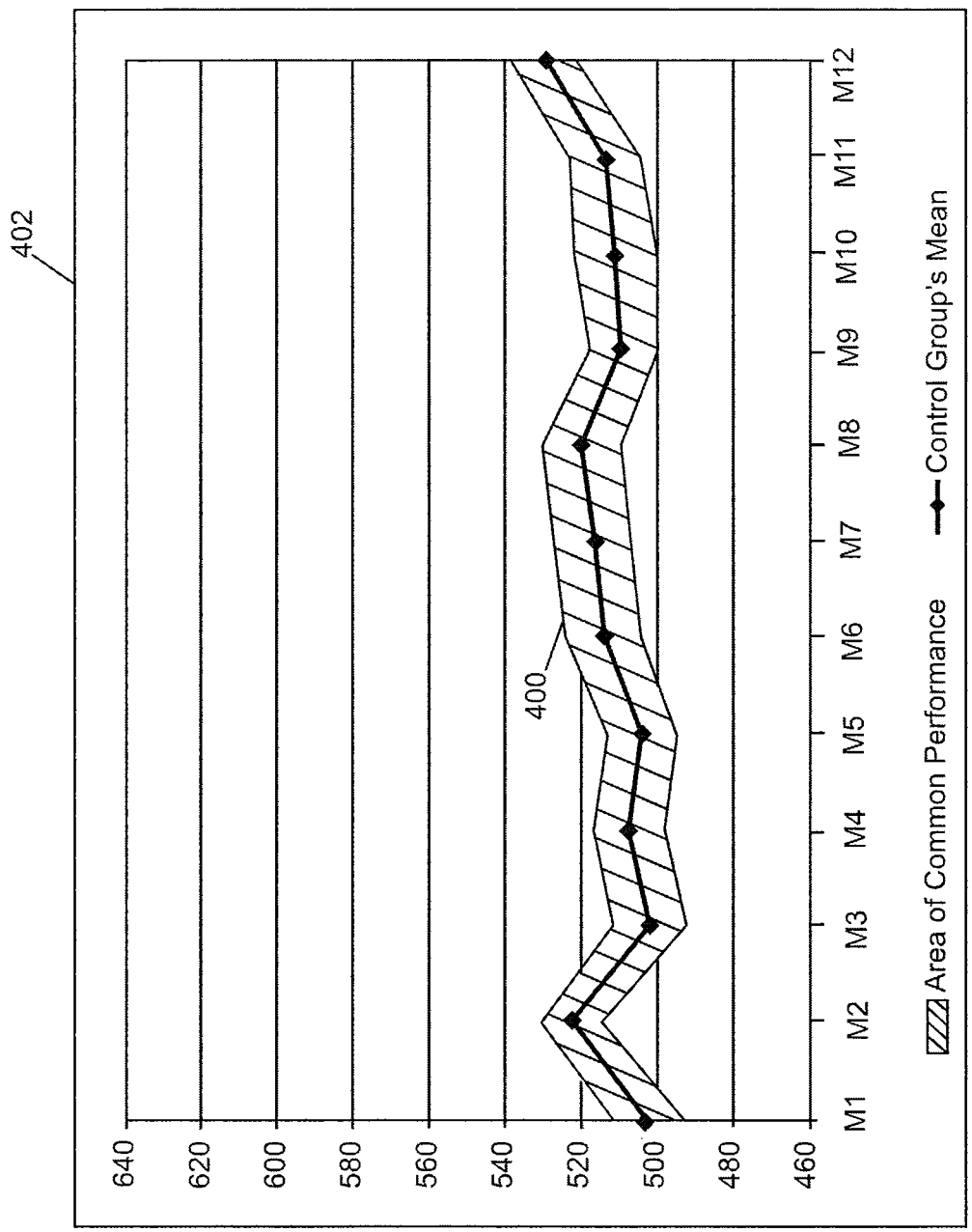
FIG. 4 is a screenshot illustrating how the area of common performance is graphically represented in an example application of an embodiment of the present invention.

When plotted, the sample mean of the sales data and its corresponding confidence intervals form the area of common performance, 400, for the SSOT chart, 402, shown in FIG. 4.

Figure 5:
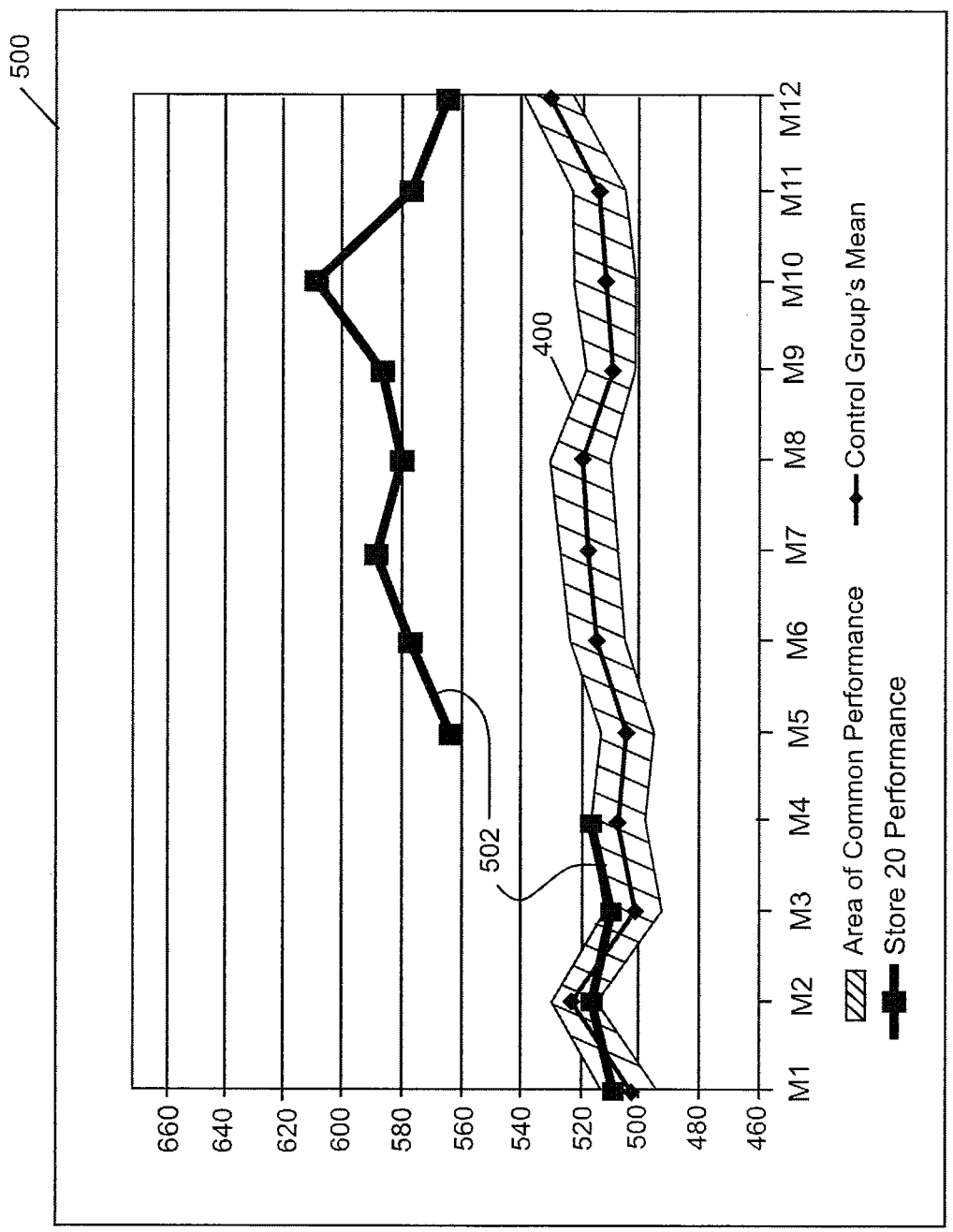
FIG. 5 is a screenshot showing the graphical display in an example application of an embodiment of the present invention, wherein the subject group data is represented with a run chart.

If the sales regional manager would like to analyze the individual performance of any given store that had implemented the new sales process, she could create a run chart using its sales data overlaying the area of common performance. For example, display 500 of FIG. 5 shows a run chart, 502, for store 20 superimposed on the same area of common performance, 400, as shown in FIG. 4.

In this example is clearly observed that during the first three months of the year, Store 20 performance was within the area of common performance, which hints that statistically speaking, its sales were not significantly better (or worse) than those of the stores in the control group. Nonetheless, starting month 5 (which coincides on the time when the store was introduced to the new sales process) its performance went above the area of common performance, which indicates that the store is statistically significantly selling more than the control group.

The sales regional manager then executes a hypothesis test of means procedure to corroborate the statistical significance visually observed in the chart. In this case, the hypothesis the sales regional manager constructed is: Ho (null hypothesis)= the individual store sales in each period is equal to the corresponding sample average of the control group; and Ha (alternate)=these two numbers are not equal. She then selects the level of significance (risk factor) and calculates the degrees of freedom or v=n−1. The critical value of t(t-crit) can be found by looking up the value in a standard critical values table for a t-distribution. The sample mean is calculated, and then t-calc is determined by the following formula.

$$t\text{-}calc = \left(\frac{\bar{x} - x\text{ target}}{\frac{s}{\sqrt{n}}}\right)$$

Finally, if t-calc>t-crit or t-calc<(−)t-crit, reject the null. Otherwise, accept the null. The following table illustrates the results of the hypothesis test.

| Store | Type of Data | M1 | M2 | M3 | M4 | M5 | M6 | M7 | M8 | M9 | M10 | M11 | M12 |
|---|---|---|---|---|---|---|---|---|---|---|---|---|---|
| Store 1 | Control | 503 | 525 | 501 | 503 | 509 | 516 | 520 | 526 | 515 | 504 | 506 | 507 |
| Store 2 | Control | 461 | 490 | 458 | 460 | 468 | 475 | 476 | 474 | 472 | 463 | 473 | 505 |
| Store 3 | Control | 474 | 502 | 472 | 483 | 471 | 485 | 484 | 500 | 483 | 479 | 491 | 503 |
| Store 4 | Control | 516 | 541 | 510 | 517 | 520 | 533 | 541 | 526 | 527 | 516 | 527 | 555 |
| Store 5 | Control | 476 | 515 | 472 | 480 | 476 | 482 | 497 | 504 | 484 | 481 | 492 | 517 |
| Store 6 | Control | 527 | 549 | 526 | 524 | 523 | 542 | 541 | 558 | 524 | 535 | 532 | 542 |
| Store 7 | Control | 504 | 540 | 502 | 514 | 506 | 527 | 512 | 526 | 511 | 524 | 504 | 551 |
| Store 8 | Control | 496 | 520 | 492 | 502 | 493 | 509 | 497 | 511 | 489 | 502 | 511 | 532 |
| Store 9 | Control | 506 | 510 | 502 | 507 | 505 | 513 | 524 | 503 | 515 | 525 | 521 | 519 |
| Store 10 | Control | 509 | 515 | 509 | 516 | 513 | 520 | 535 | 514 | 515 | 529 | 529 | 523 |
| Store 11 | Control | 518 | 539 | 520 | 522 | 519 | 517 | 530 | 523 | 519 | 520 | 528 | 543 |
| Store 12 | Control | 515 | 512 | 516 | 526 | 516 | 513 | 531 | 543 | 515 | 534 | 510 | 554 |
| Store 13 | Control | 518 | 541 | 524 | 524 | 521 | 526 | 520 | 538 | 532 | 538 | 541 | 519 |
| Store 14 | Control | 497 | 525 | 503 | 504 | 505 | 502 | 508 | 498 | 508 | 508 | 505 | 527 |
| Store 15 | Control | 520 | 516 | 514 | 528 | 520 | 541 | 532 | 547 | 526 | 515 | 538 | 549 |
| Store 16 | Control | 502 | 509 | 504 | 507 | 500 | 519 | 521 | 524 | 509 | 505 | 506 | 525 |
| Sample Mean | | 503 | 522 | 502 | 507 | 504 | 514 | 517 | 520 | 509 | 511 | 513 | 530 |
| Confidence Interval (upper) | | 512 | 530 | 511 | 517 | 513 | 523 | 526 | 530 | 518 | 522 | 523 | 538 |
| Confidence Interval (lower) | | 494 | 514 | 492 | 498 | 495 | 504 | 507 | 509 | 500 | 500 | 504 | 521 |

| Store | Type of Data | M1 | M2 | M3 | M4 | M5 | M6 | M7 | M8 | M9 | M10 | M11 | M12 |
|---|---|---|---|---|---|---|---|---|---|---|---|---|---|
| Store 1 | Control | 503 | 525 | 501 | 503 | 509 | 516 | 520 | 526 | 515 | 504 | 506 | 507 |
| Store 2 | Control | 461 | 490 | 458 | 460 | 468 | 475 | 476 | 474 | 472 | 463 | 473 | 505 |
| Store 3 | Control | 474 | 502 | 472 | 483 | 471 | 485 | 484 | 500 | 483 | 479 | 491 | 503 |
| Store 4 | Control | 516 | 541 | 510 | 517 | 520 | 533 | 541 | 526 | 527 | 516 | 527 | 555 |
| Store 5 | Control | 476 | 515 | 472 | 480 | 476 | 482 | 497 | 504 | 484 | 481 | 492 | 517 |
| Store 6 | Control | 527 | 549 | 526 | 524 | 523 | 542 | 541 | 558 | 524 | 535 | 532 | 542 |
| Store 7 | Control | 504 | 540 | 502 | 514 | 506 | 527 | 512 | 526 | 511 | 524 | 504 | 551 |
| Store 8 | Control | 496 | 520 | 492 | 502 | 493 | 509 | 497 | 511 | 489 | 502 | 511 | 532 |
| Store 9 | Control | 506 | 510 | 502 | 507 | 505 | 513 | 524 | 503 | 515 | 525 | 521 | 519 |
| Store 10 | Control | 509 | 515 | 509 | 516 | 513 | 520 | 535 | 514 | 515 | 529 | 529 | 523 |
| Store 11 | Control | 518 | 539 | 520 | 522 | 519 | 517 | 530 | 523 | 519 | 520 | 528 | 543 |
| Store 12 | Control | 515 | 512 | 516 | 526 | 516 | 513 | 531 | 543 | 515 | 534 | 510 | 554 |
| Store 13 | Control | 518 | 541 | 524 | 524 | 521 | 526 | 520 | 538 | 532 | 538 | 541 | 519 |
| Store 14 | Control | 497 | 525 | 503 | 504 | 505 | 502 | 508 | 498 | 508 | 508 | 505 | 527 |
| Store 15 | Control | 520 | 516 | 514 | 528 | 520 | 541 | 532 | 547 | 526 | 515 | 538 | 549 |
| Store 16 | Control | 502 | 509 | 504 | 507 | 500 | 519 | 521 | 524 | 509 | 505 | 506 | 525 |
| Store 20 | Subject | 509 | 515 | 509 | 516 | 564 | 578 | 588 | 581 | 587 | 608 | 576 | 565 |
| Sample Mean | | 503 | 522 | 502 | 507 | 504 | 514 | 517 | 520 | 509 | 511 | 513 | 530 |
| Confidence Interval (upper) | | 512 | 530 | 511 | 517 | 513 | 523 | 526 | 530 | 518 | 522 | 523 | 538 |
| Confidence Interval (lower) | | 494 | 514 | 492 | 498 | 495 | 504 | 507 | 509 | 500 | 500 | 504 | 521 |
| Degrees of freedom (n − 1) | | 15 | 15 | 15 | 15 | 15 | 15 | 15 | 15 | 15 | 15 | 15 | 15 |
| Tcrit (Significance = 95%) | | 2.5 | 2.5 | 2.5 | 2.5 | 2.5 | 2.5 | 2.5 | 2.5 | 2.5 | 2.5 | 2.5 | 2.5 |
| Tcalc (for Store 20) | | −1.3 | 1.6 | −1.5 | −1.9 | −13.2 | −12.9 | −14.6 | −11.4 | −17.7 | −17.9 | −13.4 | −8.0 |
| Difference is significative? (Tcalc < −Tcrit, or Tcalc > Tcrit) | | No | No | No | No | Yes | Yes | Yes | Yes | Yes | Yes | Yes | Yes |

The last row in the table corroborates that the conclusions derived by the SSOT are correct because during the first four months of the year, there is no statistical significant difference between the results of Store 20 when compared to the control group, whereas there is a statistical significant difference starting month 5 and thereafter.

Finally, to evaluate the overall impact of the new sales process, the sales regional manager utilizes a composite version of the SSOT charts, where box plots are superimposed on the area of common performance to determine if there is statistical difference between the control group and a group of subjects. To do this evaluation, the sales regional manager first calculates the statistics per time-period using data from improved stores. These statistics are the minimum and maximum values (the lowest and highest values per time period) and the first and third quartiles. These statistics are calculated, using the following formulas.

| 1st quartile | 1st quartile | 3rd quartile | 3rd quartile |
|---|---|---|---|
| $n$ odd | $n$ even | $n$ odd | $n$ even |
| $\dfrac{n+1}{4}$ | $\dfrac{n+1}{4}$ | $\dfrac{3n+3}{4}$ | $\dfrac{3n+3}{4}$ |

Median $$\tilde{x} \equiv \begin{cases} Y_{(N+1)/2} & \text{if } N \text{ is odd} \\ \dfrac{1}{2}(Y_{N/2} + Y_{1+N/2}) & \text{if } N \text{ is even} \end{cases}$$

The sample average is also determined.
The resulting values are in the table below.

| Store | Type of Data | M1 | M2 | M3 | M4 | M5 | M6 | M7 | M8 | M9 | M10 | M11 | M12 |
|---|---|---|---|---|---|---|---|---|---|---|---|---|---|
| Store 17 | Subject (unimproved) | 504 | | | | | | | | | | | |
| Store 18 | Subject (unimproved) | 496 | 520 | | | | | | | | | | |
| Store 19 | Subject (unimproved) | 506 | 510 | 502 | | | | | | | | | |
| Store 20 | Subject (unimproved) | 509 | 515 | 509 | 516 | | | | | | | | |
| Store 21 | Subject (unimproved) | 518 | 539 | 520 | 522 | 519 | | | | | | | |
| Store 22 | Subject (unimproved) | 515 | 512 | 516 | 526 | 516 | 513 | | | | | | |
| Store 17 | Subject (improved) | | 594 | 557 | 565 | 572 | 601 | 589 | 573 | 552 | 560 | 554 | 601 |
| Store 18 | Subject (improved) | | | 541 | 557 | 542 | 576 | 566 | 588 | 533 | 543 | 547 | 586 |
| Store 19 | Subject (improved) | | | | 558 | 561 | 564 | 592 | 573 | 592 | 572 | 563 | 556 |
| Store 20 | Subject (improved) | | | | | 564 | 578 | 588 | 581 | 587 | 608 | 576 | 565 |
| Store 21 | Subject (improved) | | | | | | 569 | 589 | 575 | 587 | 593 | 607 | 591 |
| Store 22 | Subject (improved) | | | | | | | 584 | 603 | 567 | 604 | 582 | 637 |
| Average | | | 594 | 549 | 560 | 560 | 577 | 585 | 582 | 570 | 580 | 572 | 589 |
| Median | | | 594 | 549 | 557.6 | 562.3 | 575.6 | 588.4 | 577.7 | 576.7 | 582.5 | 569.7 | 588.5 |
| Min Value | | | 594 | 540.7 | 557.4 | 542.4 | 564.5 | 566.0 | 572.9 | 533.4 | 542.5 | 546.9 | 555.8 |
| 1st Quartile | | | 594 | 544.8 | 557.5 | 556.2 | 568.6 | 585.2 | 573.4 | 555.6 | 563.4 | 556.3 | 570.1 |
| 3rd Quartile | | | 594 | 553.2 | 561.5 | 565.8 | 577.5 | 589.1 | 585.8 | 586.9 | 600.8 | 580.2 | 598.2 |
| Max Value | | | 594 | 557 | 565 | 572 | 601 | 592 | 603 | 592 | 608 | 607 | 637 |

Figure 6:
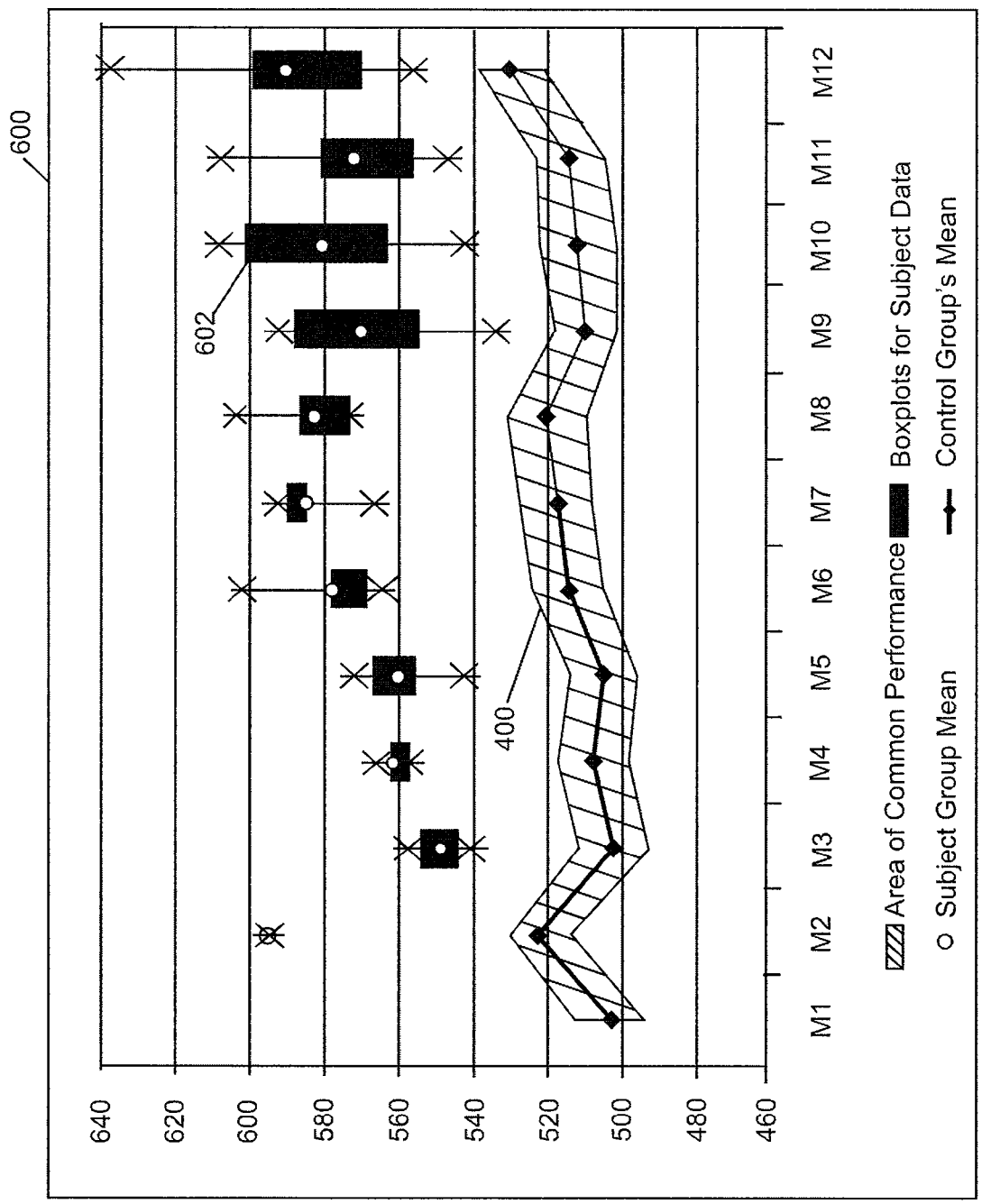
FIG. 6 is a screenshot showing the graphical display in an example application of an embodiment of the present invention, wherein the subject group data is represented with a box plot.

Using the statistics, chart 600 of FIG. 6 is created, which includes the same area of common performance, and box plots, which appear as, for example, box 602.

As it can be visually appreciated in the composite SSOT chart, all of the stores in the sales regional manager's region seem to have benefited from the new sales process, and significantly increased their sales as all of the box plots depart from the area of common performance—Note that the more the body of the box plot is separated from the area of common performance, the more statistically significant difference there is between the two data sets.

In order to validate these observations, the sales regional manager performs a hypothesis test of means for two samples. The hypothesis is constructed of Ho (null hypothesis)=the sample average of subject group sales by each period is equal to the corresponding sample average of the control group and Ha (alternate)=these two numbers are not equal. The level of significance (risk factor) is determined as before, and the sales regional manager then calculates the degrees of freedom or v=[(n1−1)+(n2−1)]. The critical value of t(t-crit) can be found by looking up the value in a standard critical values table for a t-distribution. Summary data $x_1$, $Yc_2$, is then calculated, and the polled standard deviation is calculated by the following formula.

$$s_p = \sqrt{\frac{(n_1-1)s_1{}^{\wedge}2 + (n_2-1)s_2{}^{\wedge}2}{n_1+n_2-2}}$$

The sample mean is calculated, and then t-calc is determined by the following formula.

t-calc:

$$t = \frac{(\bar{x}_1 - \bar{x}_2)}{s_p\sqrt{1/n_1 + 1/n_2}}$$

Finally, if t-calc>t-crit, reject the null, otherwise, accept the null.

The resulting values are in the table below. The last row in the table corroborates that the conclusions derived by the SSOT chart are correct because there is a statistically significant between the results obtained by the subject group in comparison to the control group. The sales regional manager then knows that her program is a success and proceeds to develop a plan to train all of her stores in the new sales process.

| Store | Type of Data | M1 | M2 | M3 | M4 | M5 | M6 | M7 | M8 | M9 | M10 | M11 | M12 |
|---|---|---|---|---|---|---|---|---|---|---|---|---|---|
| Store 1 | Control | 503 | 525 | 501 | 503 | 509 | 516 | 520 | 526 | 515 | 504 | 506 | 507 |
| Store 2 | Control | 461 | 490 | 458 | 460 | 468 | 475 | 476 | 474 | 472 | 463 | 473 | 505 |
| Store 3 | Control | 474 | 502 | 472 | 483 | 471 | 485 | 484 | 500 | 483 | 479 | 491 | 503 |
| Store 4 | Control | 516 | 541 | 510 | 517 | 520 | 533 | 541 | 526 | 527 | 516 | 527 | 555 |
| Store 5 | Control | 476 | 515 | 472 | 480 | 476 | 482 | 497 | 504 | 484 | 481 | 492 | 517 |
| Store 6 | Control | 527 | 549 | 526 | 524 | 523 | 542 | 541 | 558 | 524 | 535 | 532 | 542 |
| Store 7 | Control | 504 | 540 | 502 | 514 | 506 | 527 | 512 | 526 | 511 | 524 | 504 | 551 |
| Store 8 | Control | 496 | 520 | 492 | 502 | 493 | 509 | 497 | 511 | 489 | 502 | 511 | 532 |
| Store 9 | Control | 506 | 510 | 502 | 507 | 505 | 513 | 524 | 503 | 515 | 525 | 521 | 519 |
| Store 10 | Control | 509 | 515 | 509 | 516 | 513 | 520 | 535 | 514 | 515 | 529 | 529 | 523 |
| Store 11 | Control | 518 | 539 | 520 | 522 | 519 | 517 | 530 | 523 | 519 | 520 | 528 | 543 |
| Store 12 | Control | 515 | 512 | 516 | 526 | 516 | 513 | 531 | 543 | 515 | 534 | 510 | 554 |
| Store 13 | Control | 518 | 541 | 524 | 524 | 521 | 526 | 520 | 538 | 532 | 538 | 541 | 519 |
| Store 14 | Control | 497 | 525 | 503 | 504 | 505 | 502 | 508 | 498 | 508 | 508 | 505 | 527 |
| Store 15 | Control | 520 | 516 | 514 | 528 | 520 | 541 | 532 | 547 | 526 | 515 | 538 | 549 |
| Store 16 | Control | 502 | 509 | 504 | 507 | 500 | 519 | 521 | 524 | 509 | 505 | 506 | 525 |
| Store 17 | Subject (unimproved) | 504 | | | | | | | | | | | |
| Store 18 | Subject (unimproved) | 496 | 520 | | | | | | | | | | |
| Store 19 | Subject (unimproved) | 506 | 510 | 502 | | | | | | | | | |
| Store 20 | Subject (unimproved) | 509 | 515 | 509 | 516 | | | | | | | | |
| Store 21 | Subject (unimproved) | 518 | 539 | 520 | 522 | 519 | | | | | | | |
| Store 22 | Subject (unimproved) | 515 | 512 | 516 | 526 | 516 | 513 | | | | | | |
| Store 17 | Subject (improved) | | 594 | 557 | 565 | 572 | 601 | 589 | 573 | 552 | 560 | 554 | 601 |
| Store 18 | Subject (improved) | | | 541 | 557 | 542 | 576 | 566 | 588 | 533 | 543 | 547 | 586 |
| Store 19 | Subject (improved) | | | | 558 | 561 | 564 | 592 | 573 | 592 | 572 | 563 | 556 |
| Store 20 | Subject (improved) | | | | | 564 | 578 | 588 | 581 | 587 | 608 | 576 | 565 |
| Store 21 | Subject (improved) | | | | | | 569 | 589 | 575 | 587 | 593 | 607 | 591 |
| Store 22 | Subject (improved) | | | | | | | 584 | 603 | 567 | 604 | 582 | 637 |
| Mean Control Group | | 503 | 522 | 502 | 507 | 504 | 514 | 517 | 520 | 509 | 511 | 513 | 530 |
| Mean Subject (improved) | | #DIV/0! | 594 | 549 | 560.1 | 559.6 | 577.5 | 584.7 | 582.0 | 569.6 | 579.9 | 571.5 | 589.2 |
| Degrees of freedom | | 14.0 | 15 | 16.0 | 17.0 | 18.0 | 19.0 | 20.0 | 20.0 | 20.0 | 20.0 | 20.0 | 20.0 |
| T-crit | | 2.5 | 2 | 2.5 | 2.5 | 2.4 | 2.4 | 2.4 | 2.4 | 2.4 | 2.4 | 2.4 | 2.4 |
| Pooled Std Deviation | | #DIV/0! | #DIV/0! | 19.1 | 17.8 | 17.3 | 18.7 | 17.6 | 19.4 | 19.2 | 22.8 | 19.6 | 20.9 |
| T-calc | | #DIV/0! | #DIV/0! | −3.3 | −4.7 | −5.7 | −6.6 | −8.1 | −6.7 | −6.6 | −6.3 | −6.2 | −5.9 |
| Difference is significative? (Tcalc < −Tcrit, or Tcalc > Tcrit) | | #DIV/0! | #DIV/0! | Yes | Yes | Yes | Yes | Yes | Yes | Yes | Yes | Yes | Yes |

With respect to the above changes, the proper name "Margaret" has been replaced with the generic "sales regional manager." Applicant submits that the term "sales regional manager" is an equivalent term, as indicated by the use of "sales regional manager" as an appositive for "Margaret" in Paragraph [0031] of the specification, and does not therefore include new matter.

The flowcharts, block diagrams, tables, equations and charts in the figures and the specification illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method for generating a graph for determining the statistical significance over time of implementing a modification to a business process of a business entity, the method comprising:
   identifying a group within one business entity, the group comprising a plurality of distinct sub-entities of the same type;
   identifying a first portion of the plurality of distinct sub-entities from the group, wherein the first portion of the plurality of sub-entities is a control group that is not subject to a modification of a business process;
   identifying a second portion of the plurality of distinct sub-entities from the group, wherein the second portion of the plurality of sub-entities is a subject group that is subject to the modification of a business process, wherein the first portion of plurality of sub-entities from the group is distinct and separate from the second portion of the plurality of sub-entities from the group;
   implementing the modification of a business process of the second portion of the plurality of sub-entities from the group over a predetermined period of time;
   measuring a result of the implementing the modification of the business process of the second portion over the predetermined period of time, wherein at least one of revenue, profit, and/or market share of the second portion of the plurality of sub-entities is measured over the predetermined period of time;
   receiving data associated with the performance of the second portion of the plurality of sub-entities over the predetermined period of time;
   receiving data associated with the performance of the first portion of the plurality of sub-entities from the group over the predetermined period of time that was not subject to the modification;
   determining, by a computing device, an area of common performance over the period of time for the first portion of the plurality of sub-entities from the group based at least partially on the received data associated with the performance of the first portion of the plurality of sub-entities over the predetermined period of time, wherein the determined area of common performance relates to at least one of a revenue, profit, and/or market share of the first portion over the predetermined period of time, the determining the area of common performance comprising:
   a) calculating a mean value for the first portion of the plurality of sub-entities based on the data associated with the performance of the first portion,
   b) identifying an adequate confidence factor,
   c) calculating a confidence interval for the first portion of the plurality of sub-entities based at least partially on the calculated mean value for the first portion and the identified confidence factor,
   d) plotting the mean value for the first portion, and
   e) plotting the confidence interval associated with the plotted mean value, wherein the area of common performance is defined by an upper limit of the plotted confidence interval and a lower limit of the plotted confidence interval over the predetermined period of time;
   plotting data points associated with the received data associated with the performance of the second portion of the plurality of sub-entities over the predetermined period of time, wherein the plotted data points relate to at least one of the measured revenue, profit, and/or market share of the second portion of the plurality of sub-entities over the predetermined period of time;
   merging, by a computing device, onto one graph 1) the determined area of common performance relating at least to one of a revenue, profit, and/or market share of the first portion over the predetermined period of time for the first portion of the plurality of sub-entities from the group and 2) the plotted data points relating at least to one of a revenue, profit, and/or market share of the second portion of the plurality of sub-entities from the group over the predetermined period of time; and
   displaying, via a graphical user interface, the one graph comprising the determined area of common performance of the first portion of the plurality of sub-entities from the group and the plotted data points of the second portion of the plurality of sub-entities from the group over the predetermined period of time, wherein the one graph shows a comparison of data associated with the first portion to data associated with the second portion and a statistical significance of implementing the modification of the business process of the second portion of the plurality of sub-entities over the predetermined period of time.

2. The computer-implemented method of claim 1, further comprising determining whether the subject group data includes discrete data.

3. The computer-implemented method of claim 2, wherein the subject group data includes discrete data and further comprising:
   using the discrete data to calculate statistical parameters; and
   creating a box plot of the statistical parameters.

4. The computer-implemented method of claim 3, further comprising performing at least one hypothesis test on the subject group data and the control group data.

5. The computer-implemented method of claim 4, wherein the hypothesis test comprises a two sample t-test.

6. The computer-implemented method of claim 2 further comprising creating a run chart of the subject group data.

7. The computer-implemented method of claim 6, further comprising evaluating at least one hypothesis test on the subject group data and the control group data.

8. The method of claim 7, wherein the hypothesis test comprises a one sample t-test.

9. A computer program product for generating a graph for determining the statistical significance over time of implementing a modification to a business process of a business entity, the computer program product including a non-transitory computer readable storage medium having computer program code embodied therein, the computer program code comprising:

identifying a group within one business entity, the group comprising a plurality of distinct sub-entities of the same type;

identifying a first portion of the plurality of distinct sub-entities from the group, wherein the first portion of the plurality of sub-entities is a control group that is not subject to a modification of a business process;

identifying a second portion of the plurality of distinct sub-entities from the group, wherein the second portion of the plurality of sub-entities is a subject group that is subject to the modification of a business process, wherein the first portion of plurality of sub-entities from the group is distinct and separate from the second portion of the plurality of sub-entities from the group;

implementing the modification of a business process of the second portion of the plurality of sub-entities from the group over a predetermined period of time;

measuring a result of the implementing the modification of the business process of the second portion over the predetermined period of time, wherein at least one of revenue, profit, and/or market share of the second portion of the plurality of sub-entities is measured over the predetermined period of time;

receiving data associated with the performance of the second portion of the plurality of sub-entities over the predetermined period of time;

receiving data associated with the performance of the first portion of the plurality of sub-entities from the group over the predetermined period of time that was not subject to the modification;

determining an area of common performance over the period of time for the first portion of the plurality of sub-entities from the group based at least partially on the received data associated with the performance of the first portion of the plurality of sub-entities over the predetermined period of time, wherein the determined area of common performance relates to at least one of a revenue, profit, and/or market share of the first portion over the predetermined period of time, the determining the area of common performance comprising:

f) calculating a mean value for the first portion of the plurality of sub-entities based on the data associated with the performance of the first portion, g) identifying an adequate confidence factor;

h) calculating a confidence interval for the first portion of the plurality of sub-entities based at least partially on the calculated mean value for the first portion and the identified confidence factor, i) plotting the mean value for the first portion, and j) plotting the confidence interval associated with the plotted mean value, wherein the area of common performance is defined by an upper limit of the plotted confidence interval and a lower limit of the plotted confidence interval over the predetermined period of time;

plotting data points associated with the received data associated with the performance of the second portion of the plurality of sub-entities over the predetermined period of time, wherein the plotted data points relate to at least one of the measured revenue, profit, and/or market share of the second portion of the plurality of sub-entities over the predetermined period of time;

merging onto one graph 1) the determined area of common performance relating at least to one of a revenue, profit, and/or market share of the first portion over the predetermined period of time for the first portion of the plurality of sub-entities from the group and 2) the plotted data points relating at least to one of a revenue, profit and/or market share of the second portion of the plurality of sub-entities from the group over the predetermined period of time; and displaying, via a graphical user interface, the one graph comprising the determined area of common performance of the first portion of the plurality of sub-entities from the group and the plotted data points of the second portion of the plurality of sub-entities from the group over the predetermined period of time, wherein the one graph shows a comparison of data associated with the first portion to data associated with the second portion and a statistical significance of implementing the modification of the business process of the second portion of the plurality of sub-entities over the predetermined period of time.

10. The computer program product of claim 9 wherein the computer program code further comprises instructions for determining whether the subject group data includes discrete data.

11. The computer program product of claim 10 wherein the subject group data includes discrete data and wherein the computer program code further comprises:

instructions for using the discrete data to calculate statistical parameters; and instructions for creating a box plot of the statistical parameters.

12. The computer program product of claim 11, wherein the computer program code further comprises instructions for performing at least one hypothesis test on the subject group data and the control group data.

13. The computer program product of claim 12, wherein the hypothesis test is a two sample t-test.

14. The computer program product of claim 10 wherein the computer program code further comprises instructions for creating a run chart of the subject group data.

15. The computer program product of claim 13 wherein the computer program code further comprises instructions for performing at least one hypothesis test on the subject group data and the control group data.

16. The computer program product of claim 15, wherein the hypothesis test is a two sample t-test.

17. A apparatus for generating a graph for determining the statistical significance over time of implementing a modification to a business process of a business entity, the apparatus comprising:

a computing device configured for:
- identifying a group within one business entity, the group comprising a plurality of distinct sub-entities of the same type;
- identifying a first portion of the plurality of distinct sub-entities from the group, wherein the first portion of the plurality of sub-entities is a control group that is not subject to a modification of a business process;
- identifying a second portion of the plurality of distinct sub-entities from the group, wherein the second portion of the plurality of sub-entities is a subject group that is subject to the modification of a business process, wherein the first portion of plurality of sub-entities from the group is distinct and separate from the second portion of the plurality of sub-entities from the group;
- implementing the modification of a business process of the second portion of the plurality of sub-entities from the group over a predetermined period of time;
- measuring a result of the implementing the modification of the business process of the second portion over the predetermined period of time, wherein at least one of revenue, profit, and/or market share of the second portion of the plurality of sub-entities is measured over the predetermined period of time;
- receiving data associated with the performance of the second portion of the plurality of sub-entities over the predetermined period of time;
- receiving data associated with the performance of the first portion of the plurality of sub-entities from the group over the predetermined period of time that was not subject to the modification;
- determining an area of common performance over the period of time for the first portion of the plurality of sub-entities from the group based at least partially on the received data associated with the performance of the first portion of the plurality of sub-entities over the predetermined period of time, wherein the determined area of common performance relates to at least one of a revenue, profit, and/or market share of the first portion over the predetermined period of time, the determining the area of common performance comprising:
  - k) calculating a mean value for the first portion of the plurality of sub-entities based on the data associated with the performance of the first portion,
  - l) identifying an adequate confidence factor,
  - m) calculating a confidence interval for the first portion of the plurality of sub-entities based at least partially on the calculated mean value for the first portion and the identified confidence factor,
  - n) plotting the mean value for the first portion, and
  - o) plotting the confidence interval associated with the plotted mean value, wherein the area of common performance is defined by an upper limit of the plotted confidence interval and a lower limit of the plotted confidence interval over the predetermined period of time;
- plotting data points associated with the received data associated with the performance of the second portion of the plurality of sub-entities over the predetermined period of time, wherein the plotted data points relate to at least one of the measured revenue, profit, and/or market share of the second portion of the plurality of sub-entities over the predetermined period of time;
- merging, by a computing device, onto one graph 1) the determined area of common performance relating at least to one of a revenue, profit, and/or market share of the first portion over the predetermined period of time for the first portion of the plurality of sub-entities from the group and 2) the plotted data points relating at least to one of a revenue, profit, and/or market share of the second portion of the plurality of sub-entities from the group over the predetermined period of time; and
- displaying, via a graphical user interface, the one graph comprising the determined area of common performance of the first portion of the plurality of sub-entities from the group and the plotted data points of the second portion of the plurality of sub-entities from the group over the predetermined period of time, wherein the one graph shows a comparison of data associated with the first portion to data associated with the second portion and a statistical significance of implementing the modification of the business process of the second portion of the plurality of sub-entities over the predetermined period of time.

18. The apparatus of claim 17 further comprising:
means for using discrete data to calculate statistical parameters; and
means for creating a box plot of the statistical parameters.

* * * * *